US006999059B2

(12) United States Patent
Kim

(10) Patent No.: US 6,999,059 B2
(45) Date of Patent: Feb. 14, 2006

(54) DISPLAY APPARATUS HAVING ILLUMINATOR AND METHOD OF CONTROLLING THE SAME

(75) Inventor: Chang-son Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/404,082

(22) Filed: Apr. 2, 2003

(65) Prior Publication Data

US 2004/0210843 A1     Oct. 21, 2004

(30) Foreign Application Priority Data

Jul. 29, 2002  (KR) ................. 2002-44736

(51) Int. Cl.
*G09G 3/36*  (2006.01)
(52) U.S. Cl. .................... 345/102; 345/156
(58) Field of Classification Search .............. 345/87,
345/102, 168, 169, 170, 156; 341/22, 23,
341/20; 362/189, 190, 191; 361/680, 681
See application file for complete search history.

(56) References Cited

U.S. PATENT DOCUMENTS

| | | | | |
|---|---|---|---|---|
| 4,842,378 A | * | 6/1989 | Flasck et al. ................. 349/70 |
| 5,091,873 A | * | 2/1992 | Araki ........................... 361/681 |
| 5,144,292 A | * | 9/1992 | Shiraishi et al. .............. 345/102 |
| 5,283,673 A | * | 2/1994 | Murase et al. ................. 349/65 |
| 5,379,201 A | * | 1/1995 | Friedman .................... 362/191 |
| 5,384,516 A | * | 1/1995 | Kawabata et al. ........... 315/160 |
| 5,477,239 A | * | 12/1995 | Busch et al. ................. 345/102 |
| 5,684,513 A | * | 11/1997 | Decker ........................ 345/168 |
| 5,780,975 A | * | 7/1998 | Krafcik ...................... 315/169.3 |
| 6,161,944 A | * | 12/2000 | Leman ........................ 362/276 |
| 6,219,021 B1 | * | 4/2001 | Izumi .......................... 345/102 |
| 6,289,466 B1 | * | 9/2001 | Bayramoglu et al. ........ 713/310 |
| 6,445,143 B1 | * | 9/2002 | Min ............................. 315/307 |
| 2001/0013854 A1 | * | 8/2001 | Ogoro ......................... 345/102 |
| 2002/0122020 A1 | * | 9/2002 | Moon et al. .................. 345/89 |
| 2003/0016204 A1 | * | 1/2003 | Lee ............................. 345/102 |

FOREIGN PATENT DOCUMENTS

| | | |
|---|---|---|
| JP | 8-76882 | 3/1996 |
| JP | 10-171554 | 6/1998 |
| JP | 3078952 | 5/2001 |
| KR | 1998-20821 | 7/1998 |
| KR | 1998-68412 | 12/1998 |

* cited by examiner

*Primary Examiner*—Xiao Wu
(74) *Attorney, Agent, or Firm*—Staas & Halsey LLP

(57) ABSTRACT

A display apparatus including a main casing, and an illuminator attached to the main casing and illuminating circumference thereof, and further including an OSD input part provided for a user; an illuminating inverter provided for the illuminator; an OSD processing part outputting an OSD signal; and a controller controlling the OSD processing part so as to display an OSD menu for the illuminator according to selection of the OSD input part, and controlling the illuminating inverter so as to drive the illuminator according to selection of the OSD menu through the OSD input part. With this configuration, the present invention provides a display apparatus having an illuminator and a method of controlling the same, in which electric power and/or luminous intensity of the illuminator is controlled through an OSD.

27 Claims, 6 Drawing Sheets

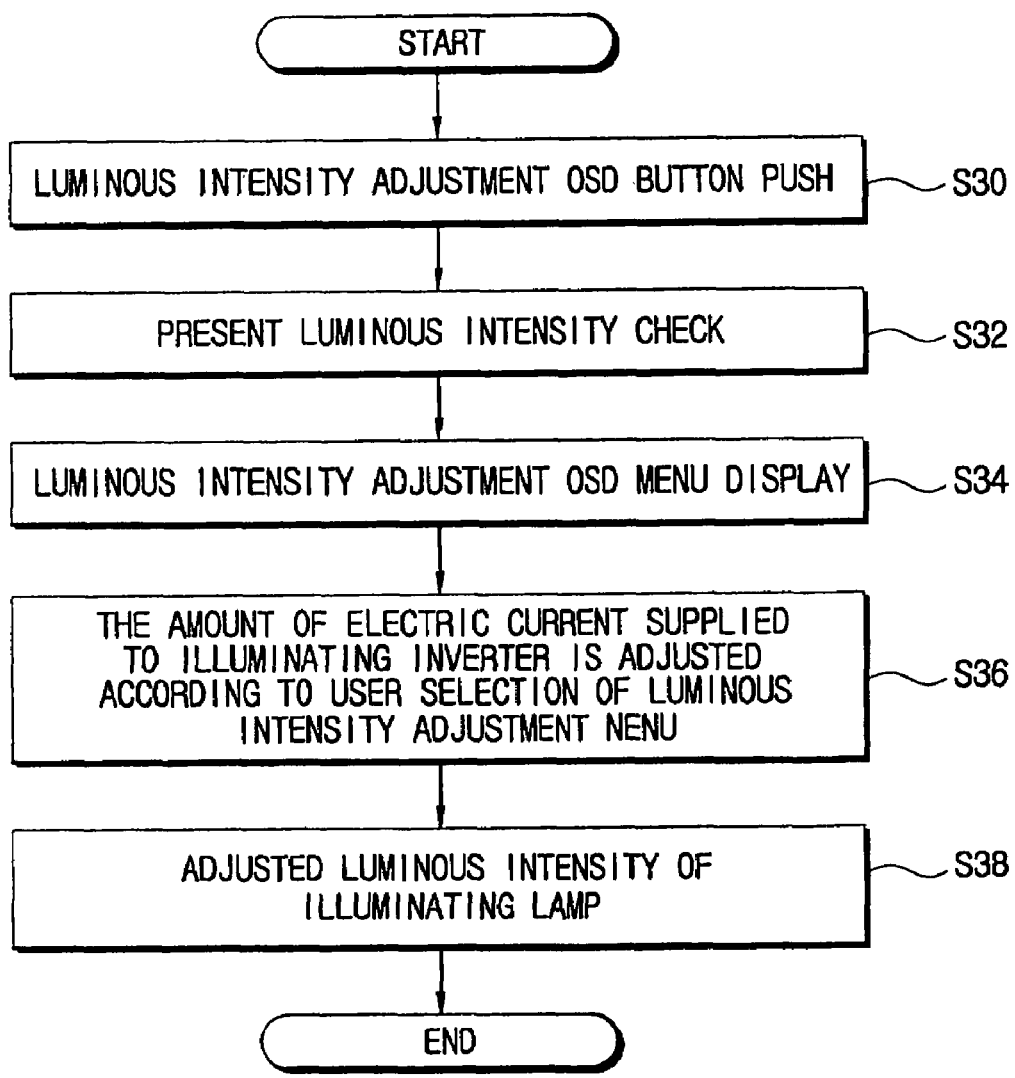

DISPLAY APPARATUS HAVING ILLUMINATOR AND METHOD OF CONTROLLING THE SAME

CROSS-REFERENCE TO RELATED APPLICATIONS

This application claims the benefit of Korean Application No. 2002-44736, filed Jul. 29, 2002, in the Korean Intellectual Property Office, the disclosure of which is incorporated herein by reference.

BACKGROUND OF THE INVENTION

1. Field of the Invention

The present invention relates to a display apparatus, and more particularly, to a display apparatus having an illuminator and a method of controlling the same, which includes a main casing, and an illuminator attached to the main casing and illuminating a circumference thereof.

2. Description of the Related Art

While using a computer system for a word processor, etc., if a user has to look at a book, a manuscript, etc., it is good for a user to employ a stand lamp for illuminating the book, the manuscript, etc. In this case, if both the computer system and the stand lamp are seated on a desk, the computer system and the stand lamp occupy a relatively large space of the desk.

To reduce the space occupied by the computer system and the stand lamp, there has been proposed a computer system having an illuminator in Korean Utility Model Publication No. 1998-020821, Korean Utility Model Publication No. 1998-068412, etc. However, the conventional computer system needs additional control buttons so as to turn on/off the illuminator and to adjust the luminous intensity thereof.

SUMMARY OF THE INVENTION

Accordingly, it is an aspect of the present invention to provide a display apparatus having an illuminator and a method of controlling the same, in which the illuminator is controlled through an OSD (on-screen display).

Additional aspects and/or advantages of the invention will be set forth in part in the description which follows and, in part, will be obvious from the description, or may be learned by practice of the invention.

The present invention may be achieved by providing a display apparatus comprising a main casing, and an illuminator attached to the main casing and illuminating the circumference thereof, further comprising an OSD input part provided for a user; an illuminating inverter provided for the illuminator; an OSD processing part outputting an OSD signal; and a controller controlling the OSD processing part so as to display an OSD menu for the illuminator according to selection of the OSD input part, and controlling the illuminating inverter so as to drive the illuminator according to selection of the OSD menu through the OSD input part.

According to an aspect of the invention, the OSD menu includes a luminous intensity adjustment item for the illuminator, and the controller controls the illuminating inverter so as to adjust the luminous intensity of the illuminator when the luminous intensity adjustment item of the OSD menu is selected through the OSD input part.

According to an aspect of the invention, the OSD menu includes a power-on/off item for the illuminator, and the controller controls the illuminating inverter so as to turn on/off the illuminator when the power-on/off item of the OSD menu is selected through the OSD input part.

According to an aspect of the invention, the OSD input part is a button type and is provided in the main casing.

According to an aspect of the invention, the illuminator includes an illuminating part, and a supporting part supporting the illuminating part to be freely disposed.

According to another aspect of the present invention, the invention may be also achieved by providing a method of controlling a display apparatus comprising a main casing, and an illuminator attached to the main casing and illuminating the circumference thereof, comprising displaying an OSD menu for the illuminator according to the selection of a user; and controlling the illuminator according to the selection of the OSD menu for the illuminator.

According to an aspect of the invention, the OSD menu includes a luminous intensity adjustment item for the illuminator, and the controlling of the illuminator according to the selection of the OSD menu includes adjusting luminous intensity of the illuminator when the luminous intensity adjustment item of the OSD menu is selected.

According to an aspect of the invention, the OSD menu includes a power-on/off item for the illuminator, and the controlling of the illuminator according to the selection of the OSD menu includes controlling electric power of the illuminator when the power-on/off item of the OSD menu is selected.

BRIEF DESCRIPTION OF THE DRAWINGS

These and other aspects and advantages of the present invention will become apparent and more readily appreciated from the following description of the preferred embodiments, taken in conjunction with the accompanying drawings of which:

FIG. 4 is a flowchart illustrating the adjusting of the luminous intensity of the illuminator of the display apparatus as shown in FIGS. 1A and 1B.

DETAILED DESCRIPTION OF THE PREFERRED EMBODIMENTS

Figure 1A:
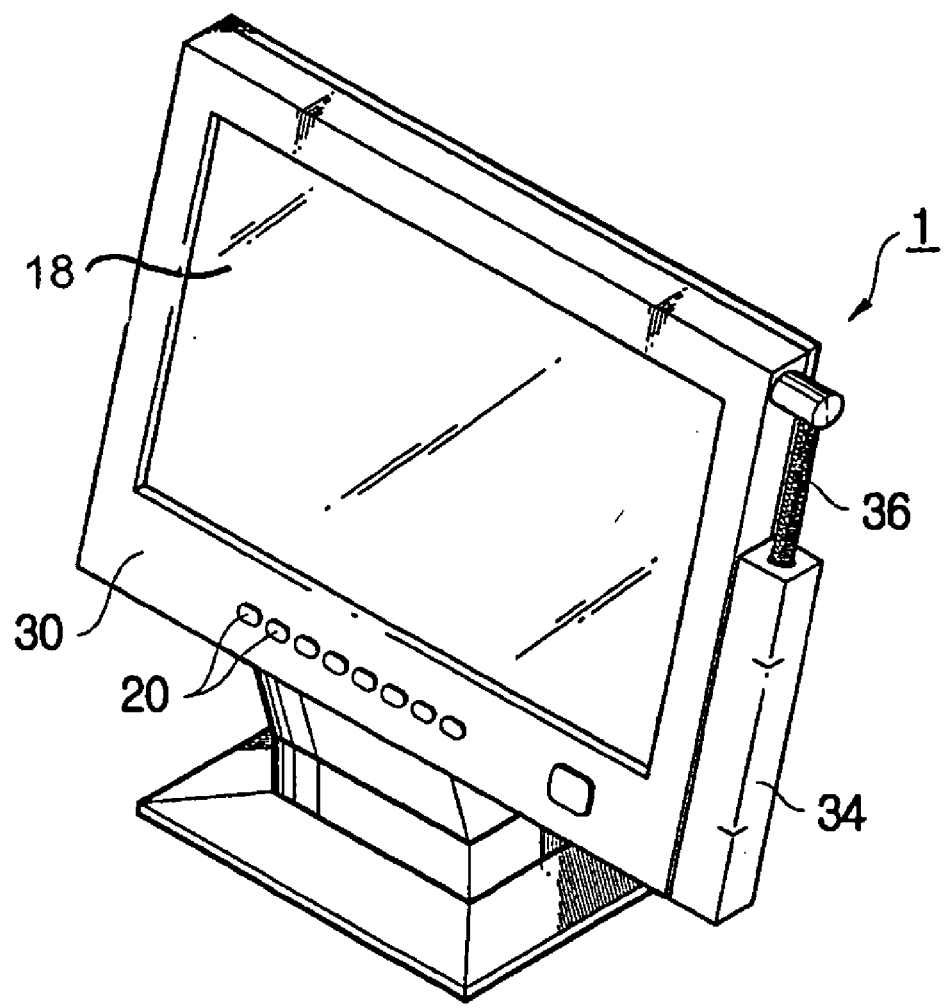
FIGS. 1A and 1B illustrate operations of an illuminator of a display apparatus according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1B:
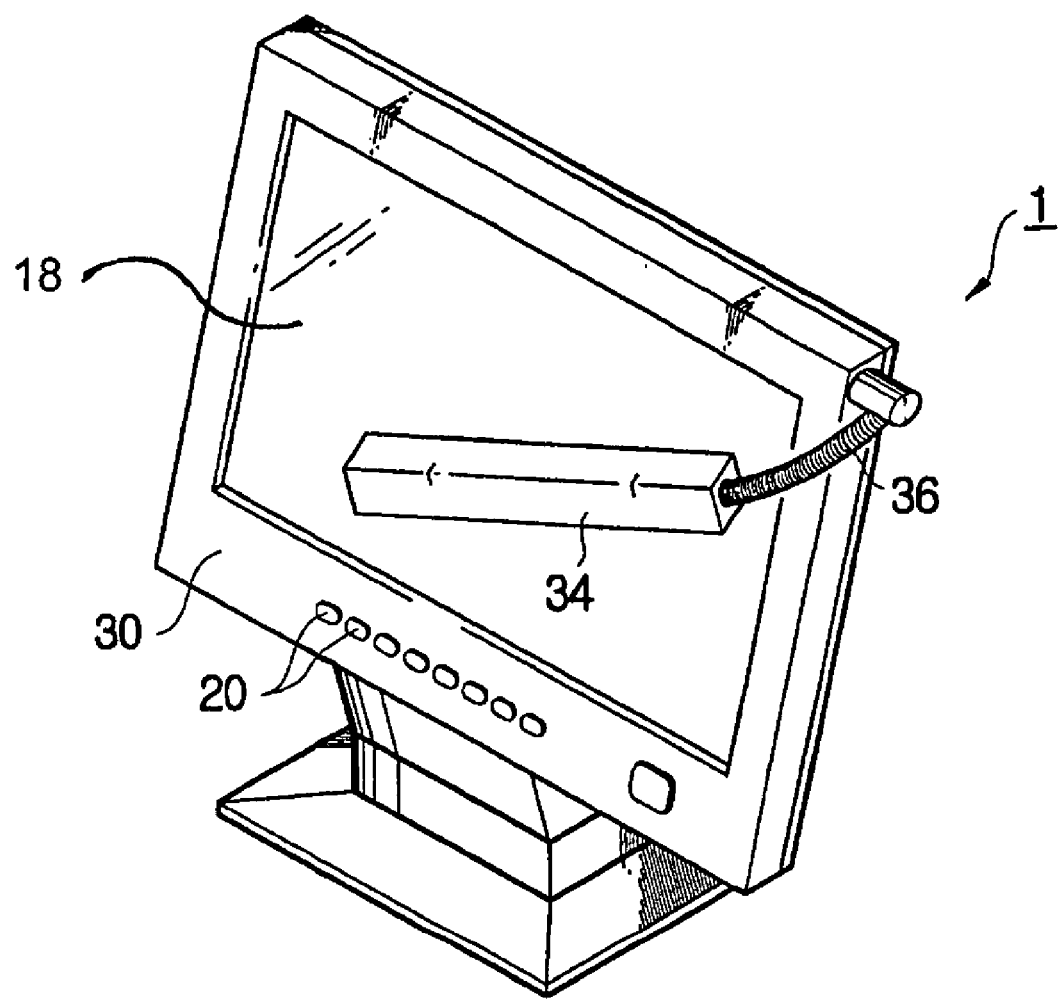

As shown in FIGS. 1A and 1B, a display apparatus 1 according to an embodiment of the present invention comprises an illuminator attached to a main casing 30 housing an LCD (liquid crystal display) panel 18, and an OSD (on-screen display) button 20 provided in the main casing 30 so as to control the illuminator. The illuminator includes an illuminating part 34 and a supporting part 36 supporting the illuminating part 34. Herein, the supporting part 36 is flexible, so that the illuminating part 34 can be freely disposed.

While not being used, the illuminator is, as shown in FIG. 1A, disposed in parallel with one side of the display apparatus 1, so that the illuminator is prevented from encumbering a user in using the display apparatus 1.

Oppositely, while being used, the illuminating part 34 of the illuminator can be, as shown in FIG. 1B, disposed freely by bending the supporting part 36 as desired, so that the illuminator illuminates certain objects such as a book, a manuscript, etc.

Figure 2:
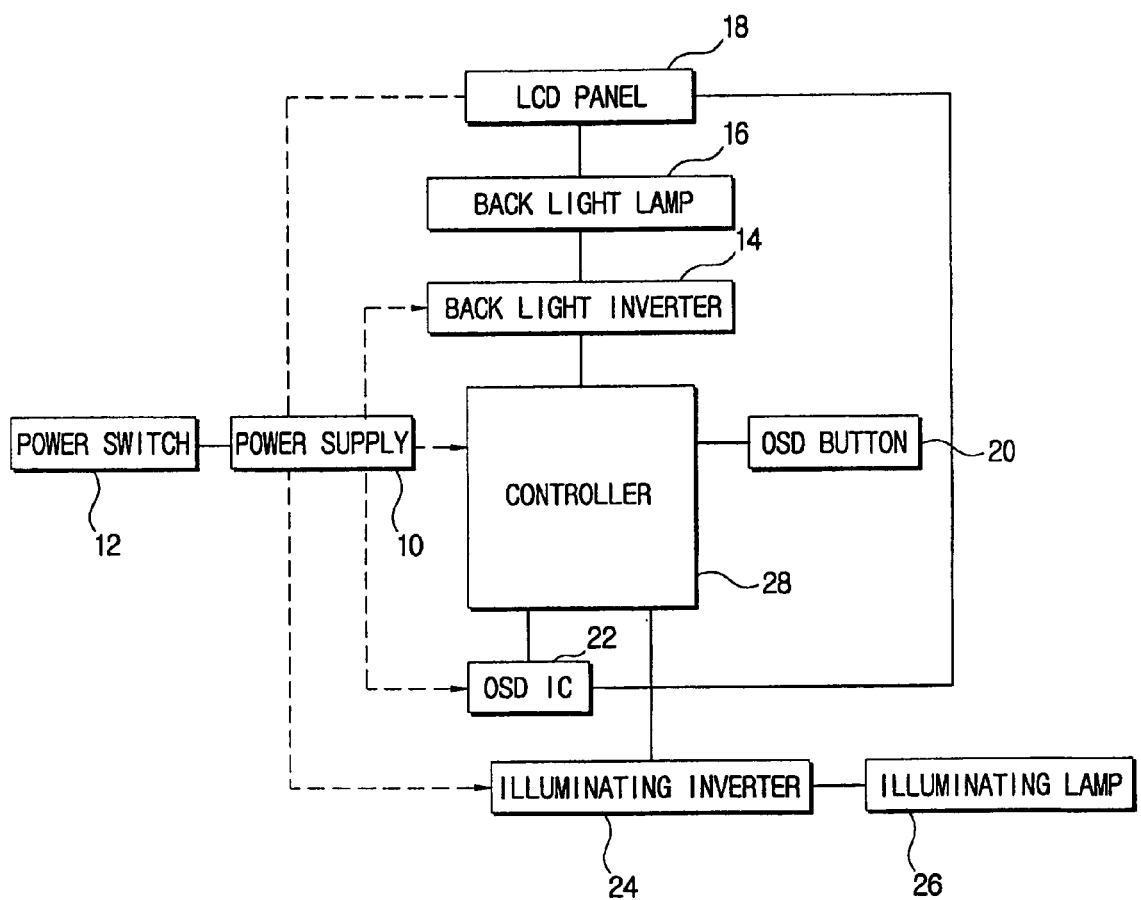
FIG. 2 is a control block diagram of the display apparatus shown in FIGS. 1A and 1B.

As shown in FIG. 2, control blocks of the display apparatus 1 are as follows. The display apparatus 1 comprises a power supply 10 coupled to the LCD panel 18, a back light inverter 14, an illuminating inverter 24, an OSD IC (integrated circuit) 22 and a controller 28, for supplying electric power to electric components, a power switch 12 coupled to the power supply 10 for turning on/off the power supply 10, the LCD panel 18 coupled to the power supply 10, an OSD IC 22 and a back light lamp 16 for displaying a picture based on a video signal processed by a signal processing part (not shown), the back light inverter 14, coupled to the back light lamp 16 and the controller 28, that is provided for the back light lamp 16 of the LCD panel 18, the OSD IC 22 coupled to the controller 28, the power supply 10 and the LCD panel 18, for outputting an OSD signal according to selection of the OSD button 20, the illuminating inverter 24 coupled to the power supply 10, the controller 28, and an illuminating lamp 26 that is provided for the illuminating lamp 26, and the controller 28, coupled to the back light inverter 14, the power supply 10, the OSD IC 22, the illuminating inverter 24 and the OSD button 20, for providing control thereto.

The power supply 10 supplies electric power to the electric components of the display apparatus 1, depending upon a control signal outputted from the controller 28 when the power switch 12 is on/off. That is, when the power switch 12 is on, the controller 28 controls the electric power to be supplied from the power supply 10 to the electric components. Further, when the power switch 12 is off, the controller 28 turns off the electric power from the power supply 10 to the electric components.

Herein, in the state that the power switch 12 is on, the illuminating lamp 26 is selected to be turned on/off through an OSD menu displayed on the LCD panel 18. At this time, the controller 28 controls the supply of the electric power to the illuminating lamp 26 according to the selection of the OSD menu.

The LCD panel 18 cannot emit light by itself, so the back light lamp 16 is needed. Further, in order to supply electric power to the back light lamp 16, the back light inverter 14 is provided. The back light inverter 14 converts DC (direct current) into AC (alternating current) and supplies the AC to the back light lamp 14, thereby allowing the back light lamp 16 to emit light toward the LCD panel 18. At this time, the luminous intensity of the back light lamp 16 is adjusted by the controller 28 controlling the amount of electric current supplied to the back light inverter 14.

The LCD panel 18 displays a picture based on a video signal processed by the signal processing part, and the OSD menu based on the OSD signal outputted from the OSD IC 22 by the controller 28.

The OSD button 20 is provided in the main casing 30, and allows the OSD IC 22 to output the OSD signal when a user pushes the OSD button 20. In response to the OSD IC 22 outputting the OSD signal, the controller 28 controls the OSD menu based on the outputted OSD signal to be displayed on the LCD panel 18. Herein, a user can select the other functions through the OSD menu displayed on the LCD panel 18 by pushing the OSD button 20. Further, the OSD menu includes items such as power-on/off, luminous intensity adjustment, an on/off-timer, etc., for the illuminating lamp 26.

The illuminating inverter 24 converts DC into AC and supplies the AC to the illuminating lamp 26, thereby allowing the illuminating lamp 26 to emit light. At this time, the controller 28 controls the electric current supplied to the illuminating inverter 24 according to the selection of the OSD menu. That is, when a user pushes the OSD button 20, the LCD panel 18 displays the OSD menu. Thereafter, when a user selects the power-on/off item of the OSD menu by pushing the OSD button 20 provided in the main casing 30, the controller 28 controls the electric current supplied to the illuminating inverter 24 according to the selection of the OSD menu. Concretely, when the power-on item is selected, the controller 28 controls the electric power to be supplied to the illuminating inverter 24, thereby turning on the illuminating lamp 26. Further, when the power-off item is selected, the controller 28 shuts off the electric power to the illuminating inverter 24, thereby turning off the illuminating lamp 26.

The controller 28 signals the OSD IC 22 to output the OSD signal according to the selection of the OSD menu. Further, the controller 28 signals the signal processing part to process the OSD signal so as to display the OSD menu on the LCD panel 18. Moreover, the controller 28 activates a supply of electric power to the illuminating inverter 24 for the illuminating lamp 26 according to the selection of the OSD menu. That is, the controller 28 controls whether the electric power is supplied to the illuminating inverter 24, thereby turning on/off the illuminating lamp 26. Further, the controller 28 controls the amount of electric current supplied to the illuminating inverter 24, thereby adjusting the luminous intensity of the illuminating lamp 26.

With this configuration, the process of controlling the illuminating lamp 26 provided in the display apparatus 1 will be described referring to FIGS. 3A, 3B and 4.

Figure 3A:
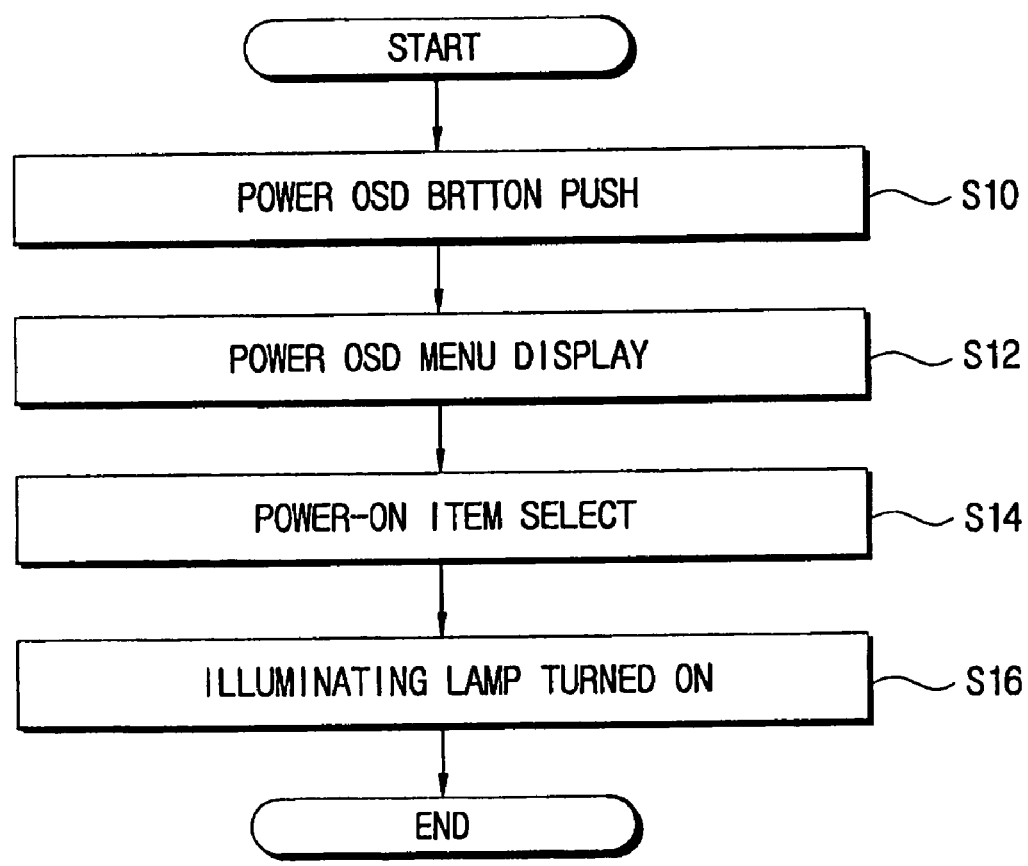
FIGS. 3A and 3B are flowcharts showing an operation of the turning on/off of an illuminator of the display apparatus as shown in FIGS. 1A and 1B.

As shown in FIG. 3A, in order to turn on the illuminating lamp 26, first, a user pushes the OSD button 20 for a power-on/off control (S10). Then, the controller 28 signals the OSD IC 22 to output the OSD signal, and the OSD signal is processed by the signal processing part, thereby displaying the OSD menu on the LCD panel 18 (S12). Thereafter, a user selects the power-on item of the OSD menu for the illuminating lamp 26 (S14). Then, the power supply 10 supplies the electric power to the illuminating inverter 24, thereby turning on the illuminating lamp 26 (S16).

Figure 3B:
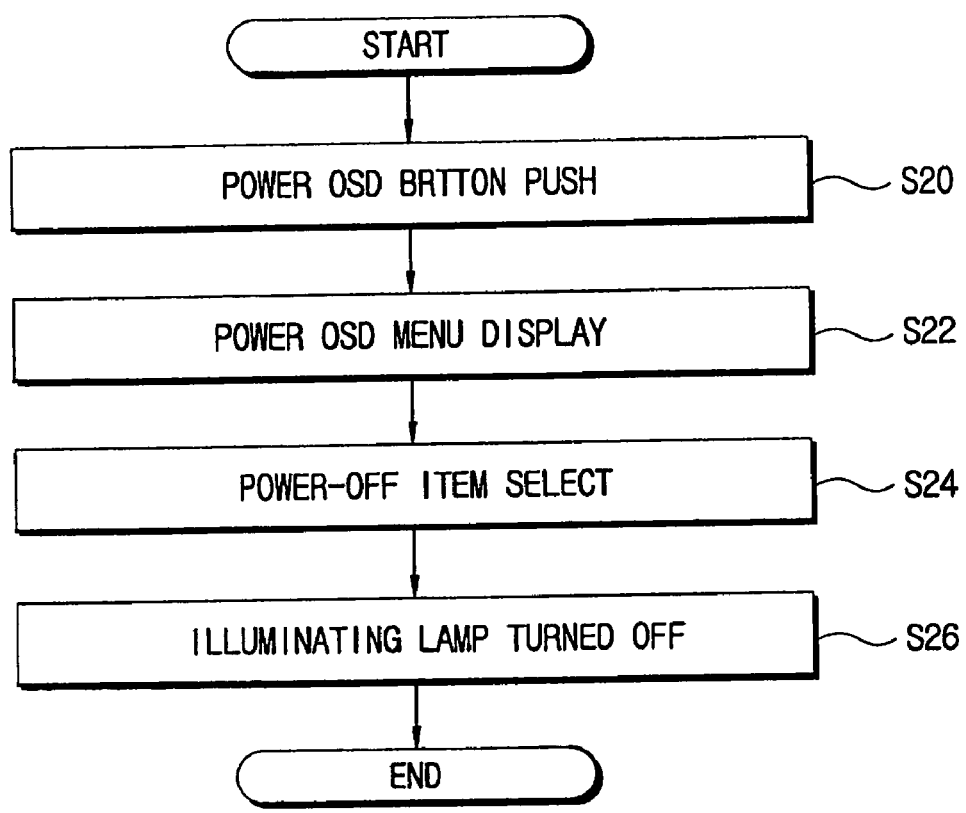

As shown in FIG. 3B, in order to turn off the illuminating lamp 26, first, a user pushes the OSD button 20 for the power-on/off control (S20). Then, the controller 28 signals the OSD IC 22 to output the OSD signal, and the OSD signal is processed by the signal processing part, thereby displaying the OSD menu on the LCD panel 18 (S22). Thereafter, a user selects the power-off item of the OSD menu for the illuminating lamp 26 (S24). Then, the power supply 10 terminates the electric power to the illuminating inverter 24, thereby turning off the illuminating lamp 26 (S26).

As shown in FIG. 4, in order to adjust the luminous intensity of the illuminating lamp 26, first, a user pushes the OSD button 20 for a luminous intensity adjustment (S30). Then, the controller 28 checks the present luminous intensity of the illuminating lamp 26 (S32) and displays the OSD menu about the luminous intensity adjustment (S34). Thereafter, a user adjusts the luminous intensity of the illuminating lamp 26 through the OSD menu according to the luminous intensity adjustment so as to allow the controller 28 to control the amount of electric current supplied to the illuminating inverter 24 (S36), thereby adjusting the luminous intensity of the illuminating lamp 26 (S38).

In the foregoing embodiment, the display apparatus 1 is not provided with a lamp power switch for tuning on/off the illuminating lamp 26 without the OSD. However, the display apparatus 1 may be provided with the lamp power switch for the illuminating lamp/illuminator 26 on the main casing 30 thereof.

In the foregoing embodiment, the display apparatus 1 is described as an LCD monitor by way of example. However, the present invention can be applied to a PDP (plasma display panel) monitor, a CRT (cathode ray tube) monitor, etc.

In the foregoing embodiment, the illuminator is controlled through the OSD button 20 provided in the main casing 30 of the display apparatus 1. However, the illuminator may be controlled through a keyboard, a mouse, etc., of a computer system including the display apparatus 1.

As described above, a display apparatus according to the present invention comprises an OSD input part for a user, an illuminating inverter provided for an illuminator, an OSD processing part outputting an OSD signal, and a controller controlling the OSD processing part to output the OSD signal according to selection of the OSD input part so as to display an OSD menu and controlling electric current supplied to the illuminating inverter according to the selection of the OSD menu so as to control the illuminator, thereby controlling the illuminator attached to the display apparatus through the OSD menu.

As described above, the present invention provides a display apparatus having an illuminator and a method of controlling the same, in which electric power or luminous intensity of the illuminator is controlled through an OSD.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising a main casing, and an illuminator attached to the main casing and illuminating a circumference thereof, further comprising:
    an OSD input part receiving inputs from a user;
    an illuminating inverter;
    an OSD processing part outputting an OSD signal to provide a display of an OSD menu; and
    a controller controlling the OSD processing part to display the OSD menu for the illuminator according to selection of the OSD input part, and controlling the illuminating inverter so as to drive the illuminator according to selection of the OSD menu through the OSD input part,
    wherein the illuminator includes an illuminating part, and a supporting part supporting the illuminating part to be freely disposed.

2. The display apparatus according to claim 1, wherein the OSD menu includes a luminous intensity adjustment item for the illuminator, and
    the controller controls the illuminating inverter so as to adjust luminous intensity of the illuminator when the luminous intensity adjustment item of the OSD menu is selected through the OSD input part.

3. The display apparatus according to claim 1, wherein the OSD menu includes a power-on/off item for the illuminator, and
    the controller controls the illuminating inverter so as to turn on/off the illuminator when the power-on/off item of the OSD menu is selected through the OSD input part.

4. The display apparatus according to claim 1, wherein the OSD input part is a button type and is provided in the main casing.

5. The display apparatus of claim 1, wherein the illuminating inverter converts direct current to alternating current for the illuminator.

6. The display apparatus of claim 1, further including a lamp power switch for the illuminator on a main casing of the display apparatus.

7. The display apparatus of claim 1, wherein the display apparatus includes one of a plasma display monitor, a cathode ray tube monitor and a liquid crystal display monitor.

8. A method of controlling a display apparatus comprising a main casing, and an illuminator attached to the main casing, comprising:
    displaying an OSD menu for the illuminator according to selection of a user;
    controlling the illuminator according to selection of the OSD menu for the illuminator;
    illuminating a circumference of the display apparatus using an illuminating part of the illuminator; and
    using a supporting part of the illuminator to support the illuminating part to be freely disposed.

9. The method according to claim 8, wherein the OSD menu includes a luminous intensity adjustment item for the illuminator, and
    the controlling of the illuminator according to selection of the OSD menu includes adjusting luminous intensity of the illuminator when the luminous intensity adjustment item of the OSD menu is selected.

10. The method according to claim 8, wherein the OSD menu includes a power-on/off item for the illuminator, and
    controlling the illuminator according to selection of the OSD menu includes controlling electric power of the illuminator when the power-on/off item of the OSD menu is selected.

11. An illuminator-enhanced display apparatus comprising:
    an illuminator unit illuminating a display panel of the display apparatus; and
    a user input control system providing illumination of the display panel in accordance with a user selection from a menu on an OSD,
    wherein the illuminator unit includes:
        an illuminator; and
        an illuminating inverter driving the illuminator to provide illumination, wherein the illuminating inverter converts direct current (DC) to alternating current (AC), and
    wherein the illuminator includes an illuminating part, and a supporting part supporting the illuminating part to be freely disposed.

12. The illuminator-enhanced display apparatus of claim 11, wherein the user input control system includes:
    the OSD input part selecting a luminous intensity setting of the illuminator;
    a controller controlling the illuminating inverter to drive luminous intensity of the illuminator according to the luminous intensity setting; and
    the OSD processing part displaying the menu on the OSD.

13. The illuminator-enhanced display apparatus of claim 12, wherein the menu includes a power on/off setting for the illuminator and the controller turns off/on the illuminator in correspondence with the power on/off setting selected through the OSD input part.

14. The illuminator-enhanced display apparatus of claim 12, wherein the OSD input part is a button part and is provided on a main casing of the display apparatus.

15. The illuminator-enhanced display apparatus of claim 12, wherein the illuminator includes an illuminating part and a supporting part that supports the illuminating part and permits positioning of the illuminating part proximate to the OSD.

16. The illuminator-enhanced display apparatus of claim 12, wherein the display apparatus includes one of: an LCD monitor, a plasma display panel monitor, and a cathode ray tube monitor.

17. The illuminator-enhanced display apparatus of claim 16, wherein the display apparatus includes the LCD monitor and the user input control system further includes:
 a back light lamp emitting light toward an LCD panel of the LCD monitor; and
 a back light inverter providing electric power to the back light lamp.

18. A method of controlling illumination for a display apparatus having an illuminator attached to a main casing and an illuminating circumference, comprising:
 selecting a desired luminous intensity from an OSD menu on a display;
 controlling the luminous intensity of the illuminator in accordance with the desired luminous intensity.
 illuminating a circumference of the display apparatus using an illuminating part of the illuminator; and
 using a supporting part of the illuminator to support the illuminating part to be freely disposed.

19. The method of claim 18, wherein the selecting a desired luminous intensity includes:
 selecting a power on/off menu item for the illuminator, wherein a controller turns on/off power for the illuminator.

20. The method of claim 18, wherein controlling the luminous intensity of the illuminator includes controlling an amount of electric current supplied to an illuminating inverter that is coupled to the illuminator.

21. The method of claim 18, wherein the controlling the luminous intensity of the illuminator includes, upon selection of an item from the OSD menu, activating an OSD integrated circuit by a controller to activate a function of the item.

22. The method of claim 21, wherein the function includes a timer function.

23. The method of claim 18, wherein the controlling the luminous intensity of the illuminator includes using an illuminating inverter to convert direct current to alternating current for the illuminator.

24. A display apparatus comprising:
 a main casing having an illuminator unit attached to the main casing and illuminating a circumference thereof, wherein the illuminator unit includes an illuminator and an illuminating inverter; and
 a controller to drive the illuminating inverter in response to user input selection on an OSD menu.
 wherein the illuminator includes an illuminating part, and a supporting part supporting the illuminating part to be freely disposed.

25. The display apparatus of claim 24, wherein the controller outputs an OSD signal to provide a display of the OSD menu.

26. A display apparatus comprising a main casing, and an illuminator attached to the main casing and illuminating a circumference thereof, further comprising:
 an OSD input part receiving inputs from a user;
 an illuminating inverter;
 an OSD processing part outputting an OSD signal to provide a display of an OSD menu; and
 a controller controlling the OSD processing part to display the OSD menu for the illuminator according to selection of the OSD input part and controlling the illuminating inverter so as to turn on/off the illuminator and to adjust luminous intensity of the illuminator according to selection of the OSD menu through the OSD input part,
 wherein the illuminator includes an illuminating part, and a supporting part supporting the illuminating part to be freely disposed.

27. A display apparatus, comprising:
 a main casing, comprising:
  an OSD processing part outputting an OSD signal in response to a user input to provide a display of an OSD menu; and
  a controller controlling the OSD processing part, and controlling an illuminating inverter of an illuminator to drive the illuminator according to a user selection of the OSD menu; and
 the illuminator attached to the main casing and illuminating a circumference thereof, wherein the illuminator comprises:
  the illuminating inverter;
  an illuminating part; and
  a supporting part supporting the illuminating part to be freely disposed.

* * * * *

UNITED STATES PATENT AND TRADEMARK OFFICE
CERTIFICATE OF CORRECTION

| | | |
|---|---|---|
| PATENT NO. | : 6,999,059 B2 | Page 1 of 1 |
| APPLICATION NO. | : 10/404082 | |
| DATED | : February 14, 2006 | |
| INVENTOR(S) | : Chang-son Kim | |

It is certified that error appears in the above-identified patent and that said Letters Patent is hereby corrected as shown below:

Column 6, line 44, Claim 11, replace "display panel" with --circumference--, therefor;

Column 7, line 29, Claim 18, replace "intensity" with --intensity;--, therefor;

Column 8, line 7, Claim 24, replace "menu." with --menu,--, therefor;

Column 8, line 26, Claim 26, replace "part" with --part,--, therefor.

Signed and Sealed this

Eighteenth Day of July, 2006

JON W. DUDAS
*Director of the United States Patent and Trademark Office*